United States Patent [19]

Webster

[11] Patent Number: 4,638,928
[45] Date of Patent: Jan. 27, 1987

[54] HOT BEVERAGE CONTAINER

[75] Inventor: Joseph P. Webster, St. Charles County, Mo.

[73] Assignee: Newco Enterprises, Inc., St. Charles, Mo.

[21] Appl. No.: 614,538

[22] Filed: May 29, 1984

[51] Int. Cl.⁴ ............................................. B67D 5/38
[52] U.S. Cl. ................................ 222/155; 222/465 R; 126/384; 126/390
[58] Field of Search ................ 219/433; 126/381, 382, 126/384, 390; 99/282, 283, 315; 222/146.2, 146.5, 155, 159, 154, 465 R, 465 A

[56] References Cited

U.S. PATENT DOCUMENTS

| | | | |
|---|---|---|---|
| 104,611 | 6/1870 | Marshall | 126/390 |
| 607,542 | 7/1898 | Ingle | 126/381 |
| 1,159,518 | 11/1915 | Maul | 222/155 |
| 1,383,949 | 7/1921 | Howard | 219/433 |
| 1,432,950 | 10/1922 | Bell | 126/390 |
| 1,467,141 | 9/1923 | Demuth | 126/382 |
| 1,512,971 | 10/1924 | Zolleis | 222/155 |
| 1,602,722 | 10/1926 | Sturdivant | 222/155 |
| 2,414,521 | 1/1947 | Gunther | 219/433 |
| 2,750,870 | 6/1956 | Colonna . | |
| 3,465,745 | 9/1969 | Butler | 126/384 |
| 3,517,603 | 6/1970 | Bruenjes et al. . | |
| 4,309,939 | 1/1982 | Stover . | |
| 4,467,784 | 8/1984 | Lee et al. | 126/381 |

Primary Examiner—H. Grant Skaggs
Attorney, Agent, or Firm—Paul M. Denk

[57] ABSTRACT

A container for brewed beverage incorporating a vessel having continuous sidewalls, an integral bottom wall, that is concaved or recessed upwardly within the formed container, to form an air pocket intermediate it and the heating element upon which it rest; the lid of the container is likewise formed of a particular shape, generally being concaved downwardly, so as to collect any generated moisture as a condensate for dripping and deposit back into the brewed beverage to maintain its flavor. A sight gauge is provided along the side of a selectively designed container, to provide a ready observation of the beverage level within the container, and a dispenser connects upon a connector tube extension for affording easy dispensing of beverage from the container even as it rests upon its heating element, or plate.

7 Claims, 7 Drawing Figures

HOT BEVERAGE CONTAINER

BACKGROUND OF THE INVENTION

This invention relates generally to a beverage decanter, and more specifically pertains to a hot beverage container substantially formed of metal or glass and incorporating integral structure for enhancing the heat retention of the warmed beverage, sustaining its lasting flavor.

As is well known, the standard type of beverage decanter, and particularly the coffee vessel, such as that which is shown in the Martin U.S. Pat. No. 3,336,856, comprising basically a pyrex type of glass formed vessel, having the rather standard shape, and with a reduced dimensioned pour spout formed at its upper edge. This type of decanter is rested upon the style of warmer for beaker, as also shown in said Martin patent, and remains there during coffee brewing, or to assure its warming, after a brewing cycle has been completed. Generally, and as also can be seen in the Hausam U.S. Pat. No. 3,343,478, the warmers are generally concaved in structure, having a raised marginal rim, so that the convex bottom of the coffee decanter can rest snuggly therein, and have direct and contiguous contact with the hot plate portion of the warmer so as to achieve maximum transfer of heat from the electrical element of the warmer to the brewed coffee, tea, or the like. Similar type of the standard form of beverage warmers are also shown in the Hausam U.S. Pat. No. Des. 212,317, the Reynolds, et al, U.S. Pat. No. 3,479,949, and the Bunn U.S. Pat. No. Re.25,663, and related type of devices.

There are various style of beverage urns or vessels that are designed for holding a bulk supply of freshly brewed or warmable coffee, or related type of beverages, and such is shown in the Colonna U.S. Pat. No. 2,750,870. In addition, various types of coffee urns for achieving the brewing of coffee in the first instance are shown in the Bruenjas U.S. Pat. No. 3,517,603, U.S. Pat. No. 4,207,809, to Brill, and U.S. Pat. No. 4,309,939, to Stover. But, in most of the embodiments shown, the particular urns are integrally structured into the brewing apparatus itself, and are used primarily for the brewing of the beverage initially, rather than functioning as a vessel for containment of the beverage after it has been brewed, and to be sustained in its warmth for eventual consumption.

It is, therefore, the principal object of this invention to provide a vessel for receiving beverage while it is being brewed, and to retain the same in sustained warmth at uniform temperature to maintain the coffee freshness and aroma even though it may not be consumed for some time.

Another significant object of this invention is to provide a container or vessel for a brewed beverage and which is particularly shaped to cooperate most effectively with the heating element to maintain a constant and uniform heat for sustaining the warmth of the beverage until eventual consumption.

Another object of this invention is to provide a hot beverage container which functions most effectively to sustain beverage aroma and flavor over prolonged periods of time, and thereby eliminate the usual waste associated with the current style of coffee brewers where the overheating of it usually leads to a throwaway if not consumed within a reasonable period of time.

A further object of this invention is to provide a hot beverage container having a particularly shaped bottom and which effectively functions to encapsulate a cushion of heat that effectively maintains the brewed beverage at a predetermined sustained temperature.

Another object of this invention is to provide a particularly structured hot beverage container which is fabricated essentially from metal, and thereby minimizes the chances for breakage, such as frequently occurs for the glass style of decanters normally used in coffee or other beverage brewers.

Although, another object of this invention is to provide a container of the style described and which can be fabricated of glass to furnish a very attractive decanter that yet attains most of the advantages sought from this improvement.

Still another object of this invention is to provide a coffee container having improved sight gauge for quick viewing of the coffee level, and likewise incorporates other structureal means that add to the convenience of the container's usage.

Yet another object of this invention is to provide a hot beverage container having a unique concave-shaped bottom that is designed to take the warmer's direct heat off of the coffee while keeping it at a perfect serving termperature.

Yet another object of this invention is to provide a lid design that allows moisture to rapidly return to the contained coffee, keeping the evaporation level down to a minimum for maintaining the coffee's flavor intact.

Still a significant advantage of this invention is to provide a coffee or other hot beverage container system that is designed to reduce the intense warmer heat and evaporation, eliminates the over-cooking of the contained beverage, which normally tends to ruin the beverage's taste.

These and other objects will become more apparent to the skilled in the art upon reviewing the summary of this invention, and upon undertaking a study of the description of its preferred embodiment, in view of the drawings.

SUMMARY OF THE INVENTION

This invention contemplates the formation of a container for holding particularly freshly brewed hot beverages, such as coffee, tea, or the like, and of the type that will be used primarily for sustaining the warmth of the beverage until consumption, which may be for some time, after it has been dripped brewed by the coffee making apparatus. As is well known, there are a great variety of automatic drip beverage brewers upon the market. And, these devices generally flow heated water through a pocket of ground coffee, or the like, for preparing the consumable beverage. But, in the preparation of such beverage, the freshly brewed coffee is then deposited downwardly into a vessel or decanter, usually of the glass style, and which rests directly upon the heater element, or warmer, where the coffee pot remains until the beverage is consumed. One problem, as previously alluded to, is that the closeness of the vessel in resting upon the heating element generally causes irregular heating of the brewed coffee, sometimes elevating the beverage's temperature up to approximately its boiling point, and through such heating the coffee sometimes has the tendency to take on a scaled flavor, and in addition, such overheating has a tendency to cause excessive moisture release, and evaporation, leading towards a change in the flavor of the reservoired coffee.

The current invention is to provide a structurally designed container for holding such freshly brewed coffee, or other beverages, and incorporates a vessel having the usual continuous side wall, which may be of cylindrical or other shape, but incorporates a bottom portion that is rather concaved or recessed in design, having a bottom that is upwardly disposed from the lower marginal rim of the side wall that extends downwardly for some distance below the integral bottom for the container, and therein forms a pocket intermediate the container bottom and the concaved heating element upon which the container may rest during either coffee drip brewing, or while it is being warmed for continuous consumption for some time after its preparation.

This formed air pocket intermediate the upwardly recessed or concaved bottom of the container and the heating element forms a heated pocket of air that rather effectively maintains the stored brewed coffee at a constant temperature, essentially because most of the bottom of the integral container is not in direct contact with the heating element, but rather, only the outer peripheral edge of the container bottom, and the heater element, are in contact, having the substantial center portion of the container bottom being exposed only to that heated pocket of air that maintains uniformity of heating temperature, and the temperature at which the stored coffee will be maintained awaiting consumption. For example, it has been found that where prior type of decanters rest directly upon a heating element, such as is customarily done in prior art apparatuses, the temperature variation as transferred from the heating element to the coffee vessel may vary by as much as 10 to 20 degrees, and sometimes, when the heating element may overheat in its function, may have a tendency to approximate a boiling temperature. Usually this temperature is elevated to the region of the upper 180° F. or more. This is undesirable since it leads to coffee scalding, and in addition cause an excessive evaporation that can deteriorate and substantially change the flavor of the brewed coffee. Obviously, it is highly desirable to maintain that freshly brewed coffee flavor for as long a time as possible, since that is what the customer or homemaker desires from a freshly brewed pot of coffee, or other beverage.

On the other hand, with the usage of the structured container of this invention, there is little or no direct contact of the container bottom with those directly heated parts of the heating element, and as a result, what heat is generated from the heater rises upwardly into a pocket of air arranged intermediate the container bottom, and the upward surface of the heating element, and consequently, that cushion of air functions to maintain warmth of the beverage remaining within the container, and should excessive heat develop at the burner level, it has been found that any such heat build up has minimal effect upon the temperature of the air pocket, and thus, does not vary the temperature of the brewed warm beverage to any undesirable extent.

Hence, where it is desired to maintain the temperature of the freshly brewed coffee within the container of this invention, at, for example, a temperature of 170° F. to 175° F., it has been found that temperature variation of the stored coffee will not vary by as much as 5°, plus or minus, therefrom, whereas, in the usage of the prior art type of device, that temperature variation may readily exceed by as much as 10° to 20° in either direction from the sustained temperatures in the 185° F. range.

Other advantages to this invention, and as structured into the container of this design, include a uniquely shaped lid that has a central concave portion, with an aperture therein to receive the drip of the freshly brewing beverage, but likewise, due to the unique shape of the said lid, while the coffee is being warmed, there is a tendency for any generated moisture to be attraced to the underside of the shaped lid, and then readily desposit back into the stored beverage. Hence, coffee flavor is sustained, the life of the coffee is maintained for a considerable length of time, thereby providing a desired coffee taste long after it has been freshly brewed. It has been found that the container of this invention, and its shaped lid, has reduced evaporation by as much as 80%.

Other features of this invention include a uniquely structured sight gauge, generally comprising a glass or pyrex gauge that is substantially encased within a stainless or other steel tube, to minimize glass breakage. In addition, an extended tap allows for ease of dispensing of coffee or other beverage from the container, even while it may be rested upon the hot plate or warmer of the brewing apparatus. In addition, the container is substantially formed of stainless or other steel and therefore, generally minimizing the potential for glass breakage as frequently occurs with coffee pots or urns as substantially used currently. Although, the container of this invention can be formed of glass and provides a very attractive decanter that possesses most of the attributes of this development.

The fabrication of this particular container, of the invention, while identified as being fabricated basically of stainless or other steel material, is just as likely can generally be constructed of glass, or Pyrex material, which in the latter instance, provides a very attractively appearing container for holding of a heated beverage or the like. Obviously, where the container of this invention is constructed of glass, it will preferably be of a shattered proof or related type of glass material, so as to minimize or lessen the likelihood of breakage. In addition, where the container of this invention is made of glass, or other transparent material, no sight guage will be required, since the level of fluids within the container can be readily observed.

The arrangement of the formed air pocket intermediate the bottom of the container, whether it be of a flattened or concave design, and as it rests upon the concaved heater plate or element, is designed to provide uniformity of maintenance of heat for sustaining warming of the freshly brewed beverage until it final consumption, which may be for a period of time in the vicinity of hours of duration. But, this heated pocket of air effectively maintains uniformity of temperature, as previously stated, by eliminating the direct contact as is done by state of the art coffee decanters that rest fully and contiguously upon the complete surface of the hot plate or upper surface of the heating element. As an example, the standard coffee brewing apparatus has a hot plate that is warmed in the vicinity of 100 watts, providing a temperature range somewhere between 400° to 410° F., which generates sufficient heat to cause a transfer of temperature in the vicinity of 185° to the contained coffee within the pot, as aforesaid. Thus, since voltage variations in the home or commercial establishment may increase anywhere between 105 volts to upwardly of 125 volts, the wattage changes likewise occur that may increase or decrease the heating element temperature by as much as 10°, plus or minus. Where the coffee decanter is in direct contact with the full surface of the heating element, these temperature variations are directly transferred by conduction and permeate within the contained beverage. With the construction of the container of this invention, that inherently forms an air pocket intermediate almost the entire bottom surface of its container, and the upper surface of the heating element, such temperature variations must first change the temperature of the air within the formed pocket, before it can convect any effect upon the supply of beverage. And, before that can occur, or before that much heat can transfer by way of convection, the temperature of the heating element will more than likely once again be stablizied within that 400° to 410° F. range. Thus, brewed beverage temperatures are little effected by such heating element temperature changes, where the container is constructed in accordance with the teachings of this invention, so as to form that air pocket or location of encapsulated heated air between the heating element and the rested container. Generally the prior art type of heating elements fabricated to overcome the type of problem just referred to is to incorporate an expensive either automatic temperature control, or to provide a manual control with temperature indicating means that allows for rapid readjustment in the voltage across the resistance of the heating element. While such manual control or automatic temperature control means, which are now coming into the market as self limiting temperature regulators, or as low watt density compounds for forming the heating element, the addition of these are obviated by the addition of the design of the current invention, and because incorporating these within the beverage brewing apparatuses currently in the art, can add to their expense.

DESCRIPTION OF THE PREFERRED EMBODIMENT

Figure 1:
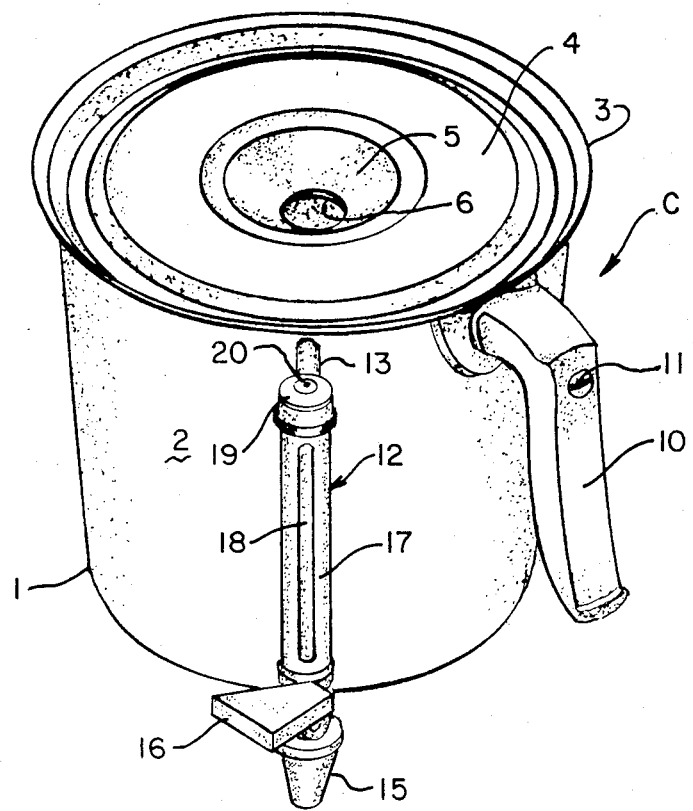
FIG. 1 provides a perspective view of the hot beverage container of this invention.
Figure 2:
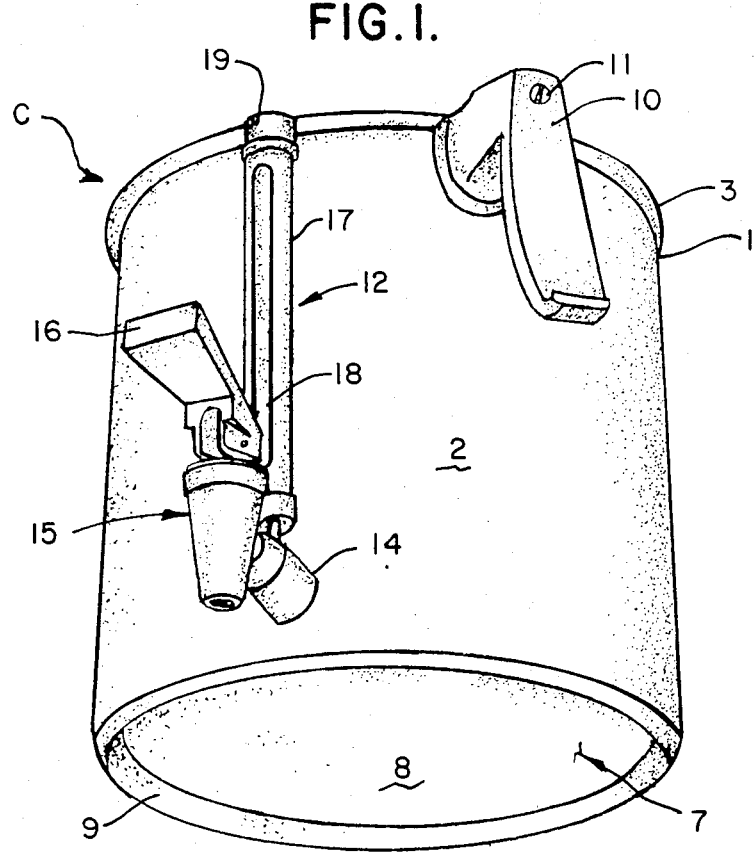
FIG. 2 provides a perspective view from a different angle of the hot beverage container of this invention.
Figure 3:
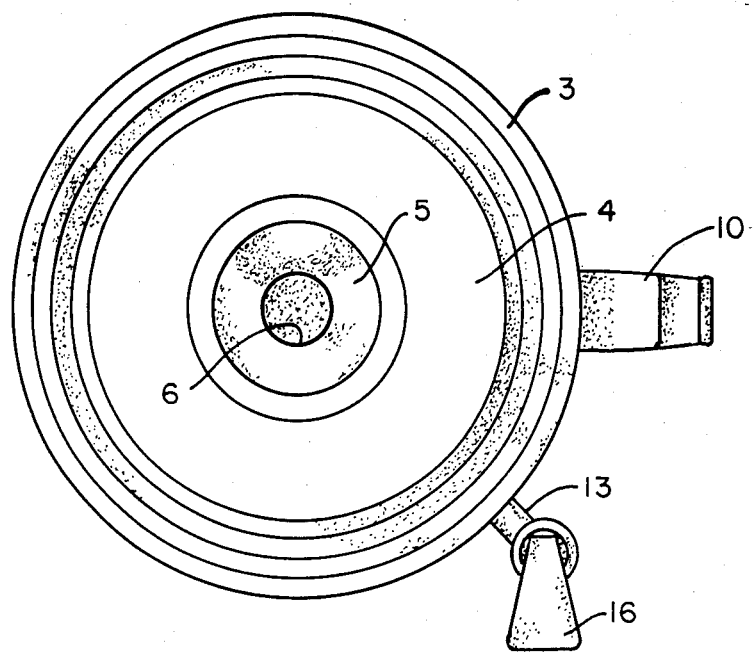
FIG. 3 is a plan view thereof.
Figure 4:
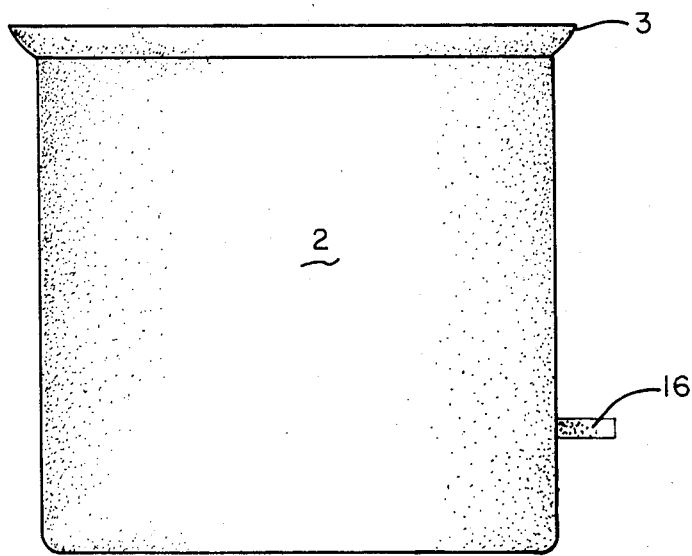
FIG. 4 is a back view thereof.
Figure 5:
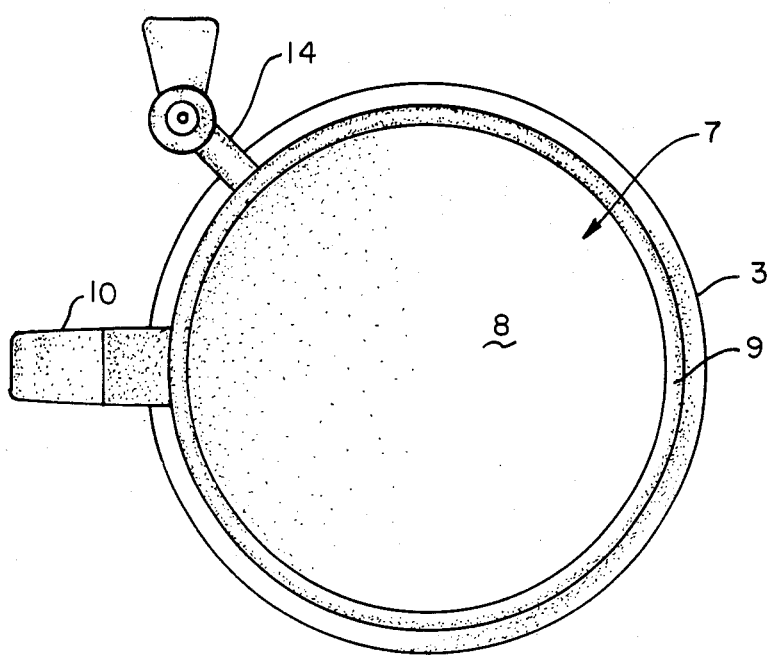
FIG. 5 is a bottom view thereof.
Figure 6:
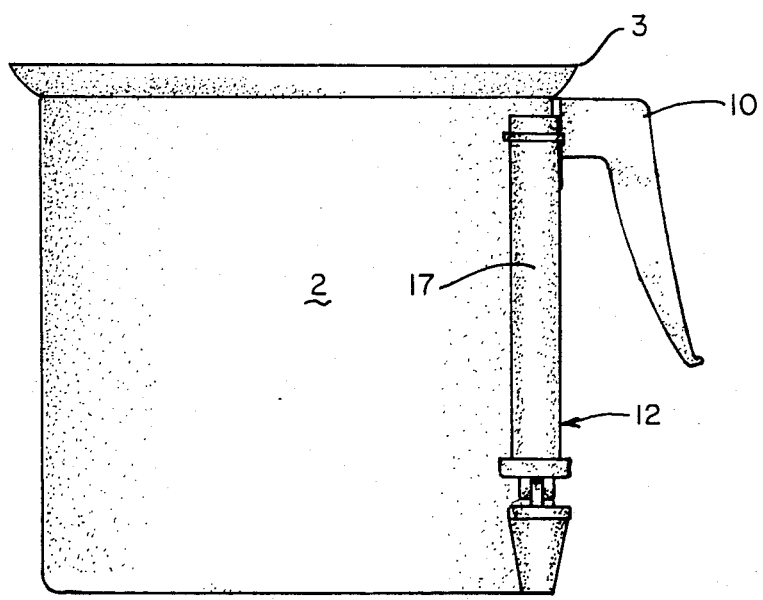
FIG. 6 is a side view from another angle thereof.

In referring to the drawings, and in particular FIGS. 1 and 2, therein is shown the hot beverage container C of this invention. In its embodiment, the container includes a vessel 1, including a continuous side wall 2, around its perimeter, generally being of cylindrical shape, although other shapes such as being squared or to other configurations may be equally conceivable. Integrally forming with the upper edge of the side wall is an outwardly flared rim 3, and resting within the rim portion is a lid 4 for the container. The lid is essentially shaped, having a concaved central portion 5, and is formed having an aperture 6 therein, so that, as previously explained, should moisture during evaporation occur through supplmental heating of the stored beverage, said moisture generally will condense upon the entire underside of the lid 4, migrate to the concaved portion 5, and will drip back into the supply of hot beverage, to maintain its flavor. This shows that the lid is cooler than the brewed beverage.

As can be seen more clearly in FIG. 2, the bottom of the container, as at 7, is formed of a rather concaved shape, generally having either a concaved or flattened plate 8, integrally blending into a marginal lip or rim 9 that extends downwardly from the side wall 2 of the structured container. The purpose for this recess, as was previously explained, and which will be elaborated upon in greater detail subsequently, is to form that air pocket for maintaining uniformity of heating of the liquid contained within the invention.

As can also be seen from FIGS. 3 through 6, various other supplemental components are provided upon this invention. For example, a handle 10 is conventiently held by means of a fastener, in the form of the screw 11, as shown, or perhaps by means of a band (not shown) that may circumvent the perimeter of the side wall 2 of the container. These are standard in the art.

In addition to the foregoing, a sight gauge 12 is provided upon the invention, and it comprises a structured tubular means incorporating connector tubes or supports 13 and 14, being arranged upper and lower thereof, respectively, with at least the lower connector tube 14 opening and communicating with the interior of the vessel, and extending outwardly for some distance, as shown, having a dispenser means 15 connected in a fluid tight seal therewith and readily available for the discharge of hot fluids, such as the brewed coffee or other beverage, upon manipulation of its standard handle 16. It is desirable that the dispenser 15 extends substantially some distance away from the side wall 2 of the container, so that coffee or other beverage can be dispensed from it even while rested upon the heating element or plate as during sustained warming.

The sight gauge 12, generally formed as a guage means, incorporates preferably a metallic tube or cover 17 that extends between the upper and lower connector tubes 13 and 14, forming a fluid-tight seal therewith, and arranges therein a glass or transparent material formed tube as at 18, and through which the level of the coffee or other hot beverage remaining in the container can be readily viewed and determined. Thus, generally the upper and lower connector tubes 13 and 14 will openingly communicate within the container, so as to provide free access without pressure disruption of the beverage within the container to flow to a corresponding level within the sight tube 18, so the quantity of beverage remaining can be observed. On the other hand, where the support tube 17 incorporates a cap, as at 19, that threadily or otherwise connects thereon, and where the cap incorporates a vent opening, as at 20, therethrough, then adequate venting of pressure is made to the atmosphere, and under that condition, the connector tube 13 need not be in open communication within the interior of the container. Which particular method for mounting of the support tube to the container is utilized is just optional. But, as can be understood, the various connections between the connector tubes 13 and 14, and the support tube 17, in addition to the locating of the transparent sight gauge 18 therein, must generally be in a fluid-tight seal so as to prevent the leakage of any beverage at the location of the interconnection between these components as fabricated into the structured container of this invention.

Figure 7:
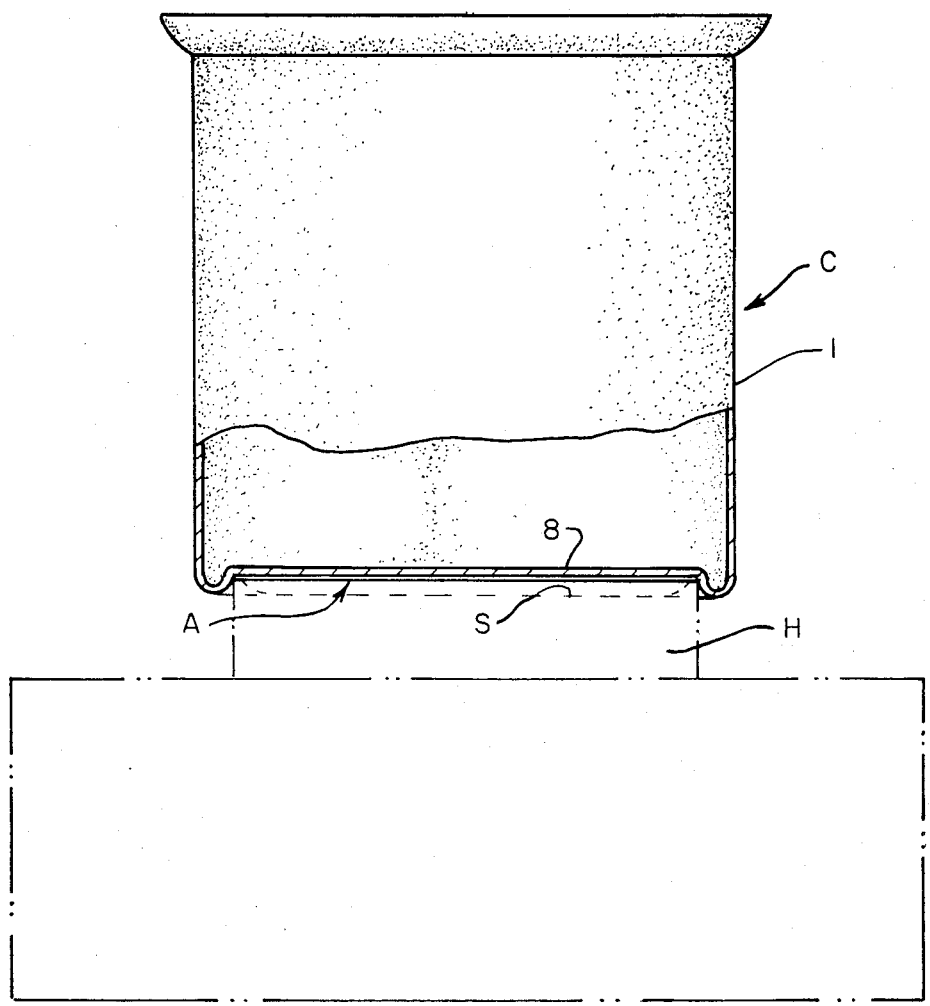
FIG. 7 is a view of the container of this invention as rested upon a hot plate as during beverage brewing and sustained warming.

In referring to FIG. 7, the application of the container C upon the hot plate H is designed to provide the uniqueness of this invention which is to form an intermediate air pocket, as at A, between the bottom flat or concaved base 8 of the container, and the surface S of the disposed hot plate or heating element H. It is this air pocket A arranged intermediate these two structured components that sustains uniformity of heating temperature for the container in application. This has already been summarized, has been found to work most satisfactory, and is to advantage in sustaining the freshness of brewed coffee, tea, or the like, and is an enhancement to the usage of this type of apparatus in the field of beverage brewing.

Various changes or modifications to the structure of this invention may be considered by those skilled in the art upon reviewing the subject matter of this disclosure. Any modification or changes, if within the spirit of this invention, are intended to be encompassed within the scope of any claims to patent protection issuing hereon. The description of the preferred embodiment set forth herein is done so for illustrative purposes only.

Having thus described the invention, what is desired to be secured by Letters Patent is:

1. In a hot beverage container for use in conjunction with a heater and of the type incorporating a vessel normally having side walls and for holding a supply of brewed beverage for dispensing and consumption, incorporating a handle for ease of handling, and having a lid for retaining heat and moisture, the improvement which comprises, said container having an integral bottom useful for resting upon a warmer, said bottom being recessed in shape to stimulate the retention of uniformly maintained heat proximate said formed bottom while preventing the buildup of excessive heat that otherwise induces beverage scalding during its heat maintenance, said container bottom including an integral rim formed peripherally of the container and aligned with its side walls, and extending downwardly of its formed bottom, said container bottom and rim providing a pocket inwardly thereof for sustaining uniform heat retention, said container having an integral and continuous upstanding sidewall, a gauge means mounting to the container upon its sidewall, said gauge means including connector tubes securing to proximate the upper and lower edges of the container, and at least the lower connector tube opening through to the interior of the container thereof, a support tube interconnecting approximately vertically between the connector tubes, said support tube having a cut-out portion formed therethrough, and a transparent tube provided within the support tube and forming a fluid tight seal with either of the support or connector tubes, and providing a viewing of the beverage level sustained within the container, said gauge means including a vent opening therein, said vent opening being above the lowermost level of the container lid, and the lower connecting tube extending further outwardly thereof of the support tube and incorporating a tap thereon for dispensing beverage therefrom.

2. The invention of claim 1 and wherein said container as resting upon a heater forming a heat retaining pocket intermediately thereof.

3. The invention of claim 1 and wherein said container bottom is concaved.

4. The invention of claim 2 or 3 and including said lid of the container also being concaved whereby generated moisture being induced to flow back into the contained beverage.

5. The invention of claim 4 and including an aperture provided centrally of the lid and at its approximate lower most location of the formed concave lid.

6. The invention of claim 1 and wherein said container being formed of stainless steel.

7. The invention of claim 1 and wherein said container being formed of glass.

* * * * *